United States Patent Office 3,014,943
Patented Dec. 26, 1961

3,014,943
PHOSPHONIC ACID ESTERS
Ernst Schegk, Wuppertal-Elberfeld, Hanshelmut Schlör, Wuppertal-Barmen, and Gerhard Schrader, Wuppertal-Cronenberg, Germany, assignors to Farbenfabriken Bayer Aktiengesellschaft, Leverkusen, Germany, a corporation of Germany
No Drawing. Filed June 16, 1958, Ser. No. 742,042
Claims priority, application Germany June 24, 1957
5 Claims. (Cl. 260—461)

The present invention relates to and has as its objects new and useful phosphonic acid derivatives and a process for their production. Generally the new compounds of the present invention may be represented by the following formula

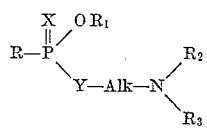

wherein R stands for a radical required for the formation of an organic phosphonic acid, $R_1$, $R_2$, $R_3$ denote low molecular weight alkyl radicals whereby $R_2$ and $R_3$ may also form a ring with the nitrogen atom and wherein $R_2$ or $R_3$ also may be of aromatic nature; Alk stands for an alkylene radical; and X and Y are each a chalcogen having an atomic weight between 16 and 33.

The manufacture of parts of these compounds may be effected by reacting the corresponding phosphonic acid or thiophosphonic acid ester chlorides with appropriately substituted amino alkyl mercaptans:

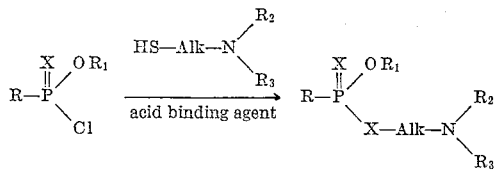

Preferably this reaction is carried out in the presence of an acid-binding agent, e.g. of alkali metal alcoholates such as sodium ethylate, sodium methylate and the like which have been proved to be particularly useful. This reaction is preferably carried out in the presence of inert organic solvents such as methyl- or ethylketone, acetone, benzene, chloroform or similar solvents. The reaction is usually started at room temperature or at temperatures slightly below room temperature and is then completed by heating on a water-bath.

Another part of the inventive compounds may be obtained by reacting the above mentioned corresponding phosphonic acid or thiophosphonic acid ester chlorides with the corresponding substituted amino alkyl alcohols. The reaction for obtaining these compounds is also preferably carried out in the presence of an acid-binding agent. However, a preferred method for the manufacture of these compounds consists in first producing the amino alcoholates (for example with metallic sodium) and then to react these with the corresponding phosphonic or thionophosponic acid halides. In this case, too, the reaction is preferably carried out in the presence of inert organic solvents.

It has also been found that some of the inventive compounds may be prepared by reacting phosphonic acid alkyl ester chlorides first with 2 mols of alkali hydroxide whereby the corresponding thionophosphonic alkyl ester acids of the following general formula

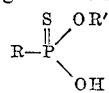

are formed. These alkyl ester acids react in their tautomeric form with appropriately substituted amino alkyl halides to form the inventive compounds:

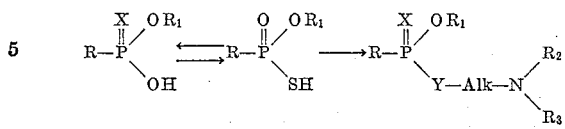

In all these above formulae R, $R_1$, $R_2$, $R_3$, X, Y and Alk have the same significance as given in the first formula shown above.

The new compounds of the present invention very effectively kill insects like flies, mites, aphids, etc. They distinguish themselves especially by a good contact-insecticidal activity and at the same time by an activity against eating insects such as caterpillars. Most surprisingly they are of remarkable low toxicity against mammals. They may be used in the same manner as other known phosphoric insecticides, i.e. in a concentration from about 0.0001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As an example for the special utility of the inventive compounds the esters of the following formulae (A)
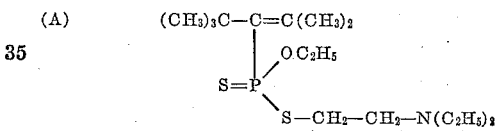

and (B)
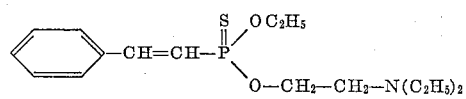

have been tested against spider mites and aphids respectively. Aqueous solutions of the aforementioned compounds have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentration.

The tests have been carried out in the following manner:

(A) *Against spider mites (contact-insecticidal action).*—Bean plants (*Phaseolus vulgaris*) of about 15 inches high are sprayed drip wet with 0.01% solutions prepared as indicated above. The bean plants have been infested heavily with the two-spotted spider (species *Tetranychus telarius*). Evaluation has been carried out after 24 hours, 48 hours and 8 days. The total percentage of killed pests after 8 days is 100%;

(B) *Against aphids (species* Doralis fabae).—Heavily infested bean plants (*Vitia faba*) have been sprayed drip wet with 0.01% solutions as prepared above. The effect has been determined by evaluation after 24 hours by counting the dead pests either on the surface of the soil or still remaining on the plants. Complete killing has been observed after 24 hours.

The following examples are given for the purpose of illustrating the invention.

Example 1

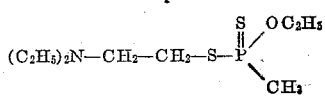

To 250 grams of a sodium ethylate solution containing 14 grams (0.3 mol) of sodium there are added 40 grams (0.3 mol) of β-diethylamino ethylmercaptan, and to this solution 50 grams of methyl-thionophosphonic acid-O-ethyl ester chloride (B.P. 63° C./12 mm. Hg) are added dropwise at 20–30° C. After the reaction is completed, the product is heated on a boiling water-bath for another hour. It is then diluted with benzene and filtered off from common salt. After distilling off the solvent under vacuum, 71 grams of the new ester remain behind having a boiling point of 67° C. under a pressure of 0.01 mm. Hg. Yield: 89% of the theoretical. Toxicity $LD_{95}$ on rats per os: 5 mg./kg.

Example 2

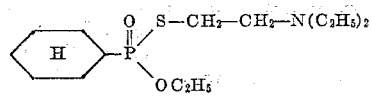

A sodium ethylate solution containing 0.17 mol of dissolved sodium is diluted with 50 millilitres of benzene. At 20° C. 24 grams of β-diethylamino ethylmercaptan (0.17 mol) are added with stirring. 37 grams of cyclohexyl-phosphonic acid ethyl ester chloride (B.P. 59–60° C./0.05 mm. Hg) are then added dropwise with further stirring at 25–30° C. and the mixture is after-stirred at 30° C. for 2 hours. After working up as usual 47 grams of the new ester are obtained as a pale yellow water-insoluble oil. Yield: 87% of the theoretical. Toxicity on rats per os: 100 mg./kg.

Example 3

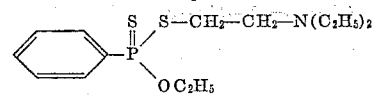

27 grams of β-diethylamino ethylmercaptan are dissolved in 30 millilitres of benzene. A sodium ethylate solution containing 0.2 mol of dissolved sodium is added thereto at room temperature. The mixture is after-stirred for 20 minutes and 44 grams of phenyl-thionophosphonic acid ethyl ester chloride are then added at 30° C. The reaction mixture is kept at 50–60° C. for a further two hours, cooled and 100 millilitres of benzene are then added to the mixture. The mixture is then poured into 200 millilitres of ice-water. The benzenic solution is separated and washed twice with 50-millilitre-portions of water, then dried over sodium sulfate and the solvent is removed by distillation under vacuum. 56 grams of the new ester are thus obtained as a yellow water-insoluble oil. Yield 88% of the theoretical.

Example 4

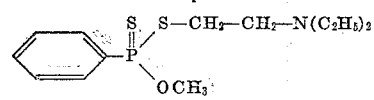

34 grams of β-diethylamino-ethylmercaptan (0.25 mol) in 50 millilitres of benzene are run at 20° C. into 13.5 grams (0.25 mol) of sodium methylate in 55 millilitres of methanol. After brief after-stirring, 52 grams (0.25 mol) of phenyl thionophosphonic acid methyl ester chloride are added dropwise at 25° C. with slight external cooling. The product is kept at 50–60° C. for 2 hours and worked up as described in Example 1, a pale yellow oil thus being obtained. Yield: 49 g. of the theoretical i.e. 65%.

Example 5

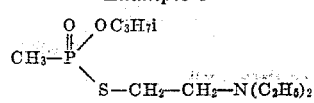

34 grams (0.25 mol) of β-diethylamino-ethylmercaptan (B.P. 64° C./10 mm. Hg; of J. Am. Chem. Soc. 67, 1223) are dissolved in 50 millilitres of toluene. This solution is added dropwise with stirring at 40–50° C. to a suspension of 6 grams of sodium powder in 100 millilitres of toluene. The sodium is dissolved after about 30 minutes. 40 grams of methyl phosphonic acid isopropyl ester chloride (B.P. 43° C./2 mm. Hg) are then added with further stirring at 40° C. The mixture is heated to 50° C. for another hour, then cooled to room temperature and about 2–3 millilitres of water are added to the reaction product. The sodium chloride formed can now be filtered off. The filtrate is dried over sodium sulfate, then fractionated. 40 grams of the new ester of B.P. 120–121° C./2 mm. Hg are thus obtained. Yield: 63% of the theoretical. The ester is barely water-soluble. The compound shows a mean toxicity of 50 mg./kg. on mice subcutaneously.

Example 6

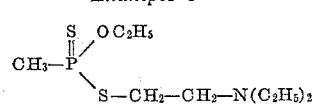

6 grams of sodium powder are suspended in 100 millilitres of benzene. 40 grams of β-diethylamino-ethylmercaptan dissolved in 150 millilitres of benzene are added dropwise thereto with stirring. 50 grams of methyl thionophosphonic acid ethyl ester chloride (B.P. 63° C./12 mm. Hg) are added at 20–30° C. with further stirring. The product is heated to 50° C. for a further half hour and then worked up as described in Example 5. 71 grams of the new ester of B.P. 67° C./0.01 mm. Hg are thus obtained. Yield: 83% of the theoretical. The ester is sparingly water-soluble; 0.001% solutions of the ester completely kill the ovae of red spiders.

Example 7

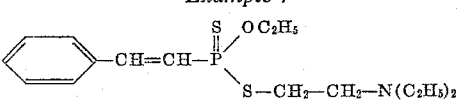

34 grams of β-diethylamino-ethylmercaptan are dissolved in 120 millilitres of anhydrous alcohol. A sodium ethylate solution containing ¼ mol of dissolved sodium is added dropwise thereto with stirring at 30° C. The mixture is after-stirred at 30° C. for a half hour and 64 grams of styryl-thionophosphonic acid ethyl ester chloride are added dropwise at the same temperature. The mixture is kept at 30° C. for another hour and then poured into 200 millilitres of ice-water. The separated oil is taken up with benzene, dried in usual manner and then separated from the solvent by distillation under vacuum. 75 grams of the new ester are thus obtained as a water-insoluble yellow oil. Yield: 87% of the theoretical. The ester still completely kills spider mites at a concentration of 0.001%.

Example 8

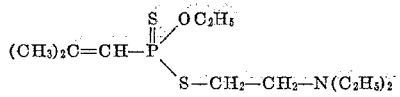

34 grams of β-diethylamino-ethylmercaptan are dissolved in 120 millilitres of anhydrous alcohol. A sodium ethylate solution containing ¼ mol of dissolved sodium is added thereto. The mixture is heated to 30° C. for a half hour and 51 grams of isobutenyl-thionophosphonic acid ethyl esther chloride are then added dropwise with stirring at 30° C. The mixture is after-stirred at 30° C. for an hour and then poured into 200 millilitres of ice-water. On working up as usual, 53 grams of the new ester are obtained as a colorless water-insoluble oil of B.P. 103° C./0.01 mm. Hg. Yield: 62% of the theoretical. The ester shows a mean toxocity of 10 milligrams/kg. on rats per os.

Example 9

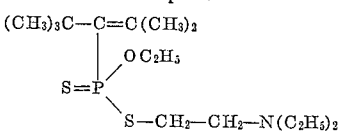

34 grams or β-diethylamino-ethylmercaptan are dissolved in 120 millilitres of methyl ethyl ketone. At 30° C. a sodium ethylate solution containing ¼ mol of dissolved sodium is added with stirring. The mixture is heated to 30° C. for a half hour and 65 grams of diisobutenyl-thionophosphonic acid ethyl ester chloride are then added dropwise with further stirring. The product is kept at 30–40° C. for another hour and then worked up in the usual manner. 69 grams of the new ester are thus obtained as a water-insoluble yellow oil. Yield: 78% of the theoretical.

Spider mites are completely killed with 0.01% concentrations of the ester. The preparation has a marked ovicidal action on the ovae of red spiders.

Example 10

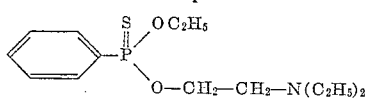

60 grams of diethylamino-ethanol are added with stirring at 50° C. to a suspension of 6 grams of sodium powder in 50 millilitres of benzene. The sodium dissolves after a short time. 57 grams of phenyl-thionophosphonic acid ethyl ester chloride (B.P. 75° C./0.01 mm. Hg) are then added dropwise with further stirring. The mixture is kept at 50° C. for another hour cooled to room temperature and poured into water. The aqueous layer is separated off, the precipitated oil is washed neutral with a 4% sodium bicarbonate solution. After separating and drying the solvent over sodium sulfate 45 grams of the new ester of B.P. 120° C./0.01 mm. Hg are obtained. Yield: 60% of the theoretical. The ester is practically water-insoluble. The ester shows a mean toxicity of 10 mg./kg. on rats per os. 0.001% suspensions kill the ovae of red spiders with certainty. By the same method, but with 40 grams of methyl-thionophosphonic acid ethyl ester chloride, the following compound is obtained

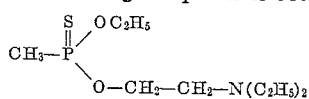

Yield: 45% of the theoretical.

Example 11

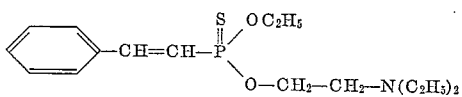

6 grams of sodium powder are suspended in 50 millilitres of benzene. 60 grams of diethylamino-ethanol are added with stirring at 50° C. After the sodium is dissolved 64 grams of styryl-thionophosphonic acid ethyl ester chloride (B.P. 97° C./0.01 mm. Hg) are added at 50° C. with further stirring. After working up as usual 65 grams of the new esters are obtained as a yellow water-insoluble oil. The compound is distillable only with decomposition even under high vacuum. Yield: 80% of the theoretical. Aphids are completely killed with 0.01% solutions.

Example 12

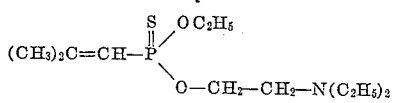

6 grams of sodium powder are suspended in 50 millilitres of benzene. 60 grams of diethylamino-ethanol are added with stirring at 50° C. The mixture is heated at 50° C. for 2 further hours. The sodium is then dissolved. 51 grams of isobutenyl thionophosphonic acid ethyl ester chloride (B.P. 50° C./0.01 mm. Hg) are then added dropwise at 50° C. with further stirring. Stirring at 50° C. is continued for 1 hour, then the mixture poured into water and worked up in usual manner. 59 grams of the new ester of B.P. 89° C./0.01 mm. Hg are thus obtained. Yield: 85% of the theoretical. The ester is barely water-soluble. The ester shows a mean toxicity of 25 mg./kg. on rats per os.

Example 13

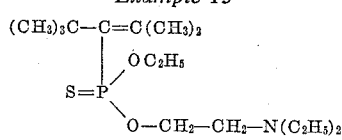

6 grams of sodium powder are suspended in 50 millilitres of benzene. 60 grams of diethylamino ethanol are added at 50° C. with stirring. The sodium is dissolved after 2 hours. 65 grams of diisobutenyl-thionophosphonic acid ethyl ester chloride (B.P. 70° C./0.01 mm. Hg) are then added dropwise at 50° C. with further stirring. The product is after-stirred at 50° C. for a further hour and then worked up in usual manner. 65 grams of the new ester of B.P. 107° C./0.01 mm. Hg are thus obtained. Yield: 77% of the theoretical, the ester is barely water-soluble. Caterpillars are completely destroyed with 0.1% solutions of the ester.

Example 14

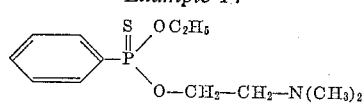

6 grams of sodium powder are suspended in 100 millilitres of benzene. 50 grams of dimethylamino-ethanol are added to this suspension at 50° C. The mixture is heated to 50° C. with stirring for 2 hours. The sodium is then dissolved. 57 grams of phenyl-thionophosphonic acid ethyl ester chloride (B.P. 75° C./0.01 mm. Hg) are then added at the aforesaid temperature with further stirring. The reaction product is kept at 50° C. for another hour, then poured into plenty of water and the separated oil is taken up with benzene. After working up as usual, 38 grams of the new ester are obtained as a colorless sparingly water-soluble oil of B.P. 110° C./0.01 mm. Hg. Yield: 56% of the theoretical.

Example 15

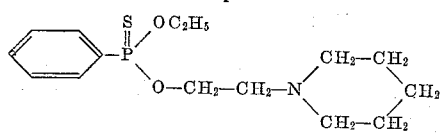

6 grams of sodium powder are suspended in 100 millilitres of benzene. 50 grams of N-β-oxethyl-piperidine (B.P. 78° C./9 mm. Hg) are added thereto at 50° C. with stirring. The mixture is kept at 50° C. for 2 hours and 57 grams of phenyl-thionophosphonic acid ethyl ester chloride are added dropwise at the said temperature. After working up as usual 53 grams of the new ester are obtained as a yellow water-insoluble oil. Yield: 68% of the theoretical. Calculated for mol 313: N=4.4%; S=10.2%; P=9.8%. Found: N=4.5%; S=10.2%; P=9.9%.

Example 16

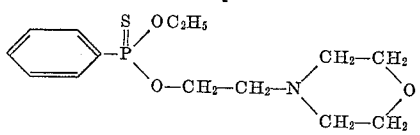

6 grams of sodium powder are suspended in 100 millilitres of benzene. 50 grams of N-β-chloroethylmorpholine (B.P. 78° C./1 mm. Hg) are added thereto with stirring at 50° C. The mixture is kept at 50° C.

for an hour and 57 grams of phenyl-thionophosphonic acid ethyl ester chloride are then added with further stirring. The reaction product is kept at 60° C. for a further hour and then worked up in usual manner. 56 grams of the new ester are thus obtained, as a pale yellow oil. Yield: 71% of the theoretical. Calculated for mol 315; N=4.4%; P=9.7%; S=10.1%. Found: N=4.7%; P=9.6%; S=10.2%.

*Example 17*

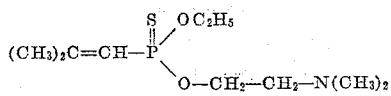

6 grams of sodium powder are suspended in 100 millilitres of benzene. 50 grams of dimethylamino-ethanol are added thereto at 50° C., the mixture is stirred at 50° C. for an hour. The sodium dissolves. 53 grams of isobutenyl-thionophosphonic acid ethyl ester chloride (B.P. 50° C./0.01 mm. Hg) are then added dropwise at 50° C., the mixture is after-stirred for an hour then diluted with 200 millilitres of benzene and washed with 250 millilitres of water. The benzenic solution is separated and dried over sodium sulfate. The filtrate is then fractionated. 47 grams of the new ester are thus obtained as a colorless water-insoluble oil. Yield: 75% of the theoretical. The new ester shows a mean toxicity of 150 milligrams/kg. on rats per os.

*Example 18*

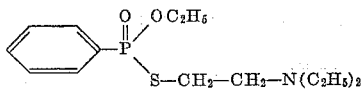

57 grams of phenyl-thionophosphonic acid ethyl ester chloride are dissolved in 125 millilitres of alcohol. After the addition of 30 millilitres of water, a solution of 29 grams of potassium hydroxide in 60 millilitres of water is added at 70° C. The temperature is maintained at 70° C. for 2 hours and 34 grams of β-chloroethyl-diethylamide are then added. The temperature is kept at 70° C. for another hour and the product is then worked up in the usual manner. 46 grams of the new ester are thus obtained as a barely water-soluble yellow oil.

*Example 19*

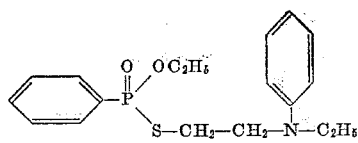

57 grams of phenyl-thionophosphonic acid ethyl ester chloride (B.P. 75° C./0.01 mm. Hg) are dissolved in 130 millilitres of anhydrous alcohol. 30 millilitres of water are added thereto and then a solution of 29 grams of potassium hydroxide in 60 millilitres of water. The mixture is heated to an internal temperature of 70–75° C. for 2 hours and 60 grams of β-bromoethyl-(N-ethylaniline) (B.P. 106° C./1 mm. Hg) are then added dropwise. The reaction product is kept at 70° C. for a further 2 hours, then cooled to room temperature, poured into 300 millilitres of water, and the precipitated oil is taken up with 200 millilitres of benzene. After working up as usual, 55 grams of the new ester are obtained as a pale yellow water-insoluble oil. Yield: 63% of the theoretical.

*Example 20*

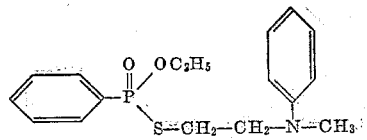

57 grams of phenylthionophosphonic acid ethyl ester chloride are dissolved in 130 millilitres of anhydrous alcohol. 30 millilitres of water are added thereto and then a solution of 29 grams of potassium hydroxide in 60 millilitres of water. The mixture is heated to an internal temperature of 70° C. for 2 hours and 55 grams of β-bromoethyl-(N-methylaniline) (B.P. 100° C./1 mm. Hg) are then added with stirring at the said temperature. The reaction product is kept at 70° C. for a further 2 hours, then cooled to room temperature and worked up in usual manner. 57 grams of a pale yellow water-insoluble oil are thus obtained. Yield: 68% of the theoretical.

*Example 21*

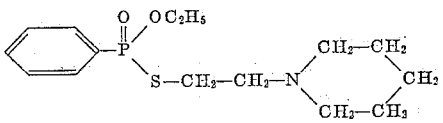

In a similar manner, there are obtained from 57 grams of phenyl-thionophosphonic acid ethyl ester chloride and 40 grams of N-β-chloroethyl-piperidine (B.P. 68° C./10 mm. Hg) 18 grams of the corresponding ester as a colorless water-insoluble oil. Yield: 23% of the theoretical.

*Example 22*

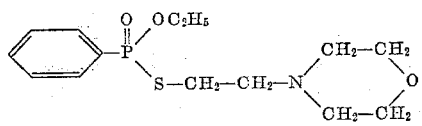

57 grams of phenyl-thionophosphonic acid ethyl ester chloride are dissolved in 130 millilitres of anhydrous alcohol. 30 millilitres of water are added with stirring thereto and then a solution of 29 grams of potassium hydroxide in 60 millilitres of water. The mixture is kept at 70° C. for 2 hours and 40 grams of N-β-chloroethyl morpholine (B.P. 47° C./1 mm. Hg) are then added at the said temperature. The reaction product is kept at 75° C. for a further 2 hours and then worked up in usual manner. 44 grams of the new ester are thus obtained as a pale yellow water-insoluble oil. Yield: 56% of the theoretical.

*Example 23*

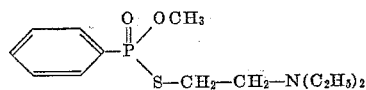

55 grams of phenylthionophosphonic acid methyl ester chloride (B.P. 65° C./0.01 mm. Hg) are dissolved in 130 millilitres of methanol. 30 millilitres of water are added thereto and then 29 grams of potassium hydroxide dissolved in 60 millilitres of water. The reaction product is heated with stirring to 70° C. for 2 hours and 35 grams of diethyl aminoethyl ester chloride are then added with further stirring at the said temperature. The temperature is maintained at 70–75° C. for a further 2 hours, the reaction product is then diluted with 300 millilitres of benzene, cooled and washed with 100 millilitres of water. The benzene layer is separated off, dried over sodium sulfate and the solvent is then evaporated under vacuum (bath temperature 100° C., pressure 0.01 mm. Hg). 35 grams of the new ester are thus obtained as a yellow, partly water-soluble oil. Yield: 50% of the theoretical. On rats per os the new ester shows a mean toxicity of 100 mg./kg.

*Example 24*

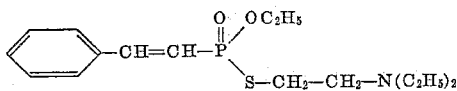

64 grams of styryl-thionophosphonic acid ethyl ester chloride are dissolved in 130 millilitres of anhydrous alcohol. 30 millilitres of water are added thereto and then 29 grams of potassium hydroxide dissolved in 60 millilitres of water. The temperature rises to 70° C.

The mixture is kept with stirring at 70° C. for a further 2 hours, and 36 grams of diethylamino-ethyl chloride are then added. The temperature is maintained at 70–80° C. for a further 3 hours while stirring is continued and the mixture is then cooled to room temperature. After working up as usual 47 grams of the new ester are obtained as a water-insoluble yellow oil. Yield: 58% of the theoretical. The new ester shows a mean toxicity of 10 mg./kg. on rats per os.

*Example 25*

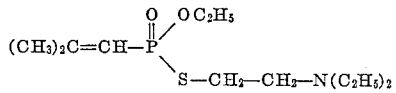

51 grams of isobutenyl-thionophosphonic acid ethyl ester chloride are dissolved in 130 millilitres of anhydrous alcohol. 30 millilitres of water are added thereto and then a solution of 29 grams of potassium hydroxide in 60 millilitres of water. The temperature rises spontaneously to 70° C. The mixture is then kept at 70° C. for a further 2 hours and 36 grams of diethylamino-ethyl chloride are then added dropwise with further stirring. The product is kept at 70° C. for a further 2 hours and then worked up as usual. 42 grams of the new ester are thus obtained as a colorless sparingly water-soluble oil of B.P. 96° C./0.01 mm. Hg. Yield: 60% of the theoretical.

*Example 26*

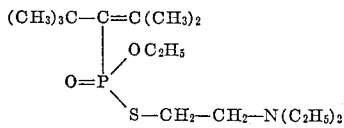

65 grams of diisobutenyl-thionophosphonic acid ethyl ester chloride are dissolved in 130 millilitres of anhydrous alcohol. 30 millilitres of water are added thereto and then a solution of 29 grams of potassium hydroxide in 60 millilitres of water while stirring. The temperature rises spontaneously to 70° C. The mixture is heated to 70–75° C. for a further 2 hours and 36 grams of diethylamino-ethyl chloride are then added dropwise with further stirring. The reaction product is then kept at 50–60° C. for another 3 hours, cooled and worked up in usual manner: 42 grams of the new ester are thus obtained as a pale yellow water-insoluble oil. Yield: 50% of the theoretical. Aphids are killed completely with 0.01% concentrations of this ester.

*Example 27*

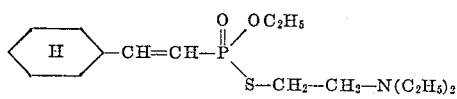

35 grams of β-diethylamino-ethylmercaptan are dissolved in 100 millilitres of methyl ethyl ketone. A sodium ethylate solution containing ¼ mol of dissolved sodium is added thereto at 30° C. The mixture is after-stirred at room temperature for a half hour and 53 grams of cyclohexylphosphonic acid ethyl ester chloride are then added dropwise at the said temperature. The mixture is kept at 30° C. for another hour, diluted with 300 millilitres of benzene and shaken with 100 millilitres of water. The benzenic solution is dried over sodium sulfate. The solvent is subsequently removed under vacuum (bath temperature 100° C., pressure 0.01 mm. Hg). 40 grams of the new ester are thus obtained as a yellow water-insoluble oil.

*Example 28*

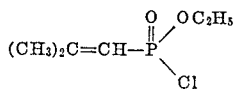

192 grams of isobutenyl phosphonic acid diethyl ester are heated while stirring at about 60–65° C.; phosgene is introduced into the container whereby the temperature adjusts automatically at 65 to 70° C. by exothermic reaction. If the reaction temperature slows down heating at 70° C. is continued for 1 further hour whereby phosgene at a lower rate is allowed to pass through the reaction mixture. The mixture then is distilled whereby the ester of the above shown formula boils at 8 to 10 mm./Hg at 100 to 110° C. or 12 mm. Hg at about 80° C. The yield is 133 grams of the theoretical, i.e. 73%.

*Example 29*

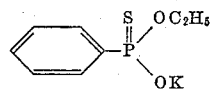

221 grams of phenyl thionophosphonic acid ester chloride are dissolved in 500 millilitres of acetonitrile. While stirring there are added 50 millilitres of water and subsequently a solution of 120 grams of KOH in 200 millilitres of water. The temperature is allowed to rise to about 70° C. and is kept there for 1 hour. The solvents then are distilled off and the residue is taken up in 800 millilitres of anhydrous alcohol. The undissolved KCl is removed by filtration with suction, and the clear alcoholic solution is concentrated. There is obtained a white crystalline reaction product which may finally be dried. There are obtained 167 grams of the above shown salt i.e. 70% of the theoretical.

*Example 30*

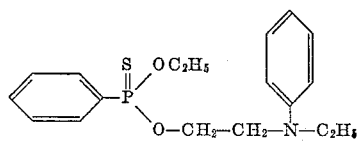

6 grams of sodium powder are suspended in 100 millilitres of benzene. At 50° C. there are added 70 grams of β-hydroxy ethyl-N-ethyl aniline. The reaction mixture is stirred at 50° C. for 1 hour, whereafter the sodium powder has disappeared. Stirring is continued and there are added at 50° C. 57 grams of phenyl thionophosphonic acid ethyl ester chloride. After 1 hour of stirring at 60° C. the reaction is completed. The reaction mixture is poured into water. The organic layer is separated and dried over anhydrous sodium sulfate. After distilling off the solvent there is obtained the above new ester as a yellowish water-unsoluble non-distillable oil in 64% of the theoretical.

Calculated for mol 349: N=4.01%; P=8.7%. Found: N=4.3%; P=8.1%.

By the same way but using 60 grams of β-hydroxy-ethyl-N-methyl aniline there are obtained 63 grams of the new ester of the following formula

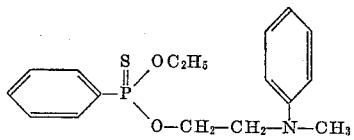

with the following analytical data:
Calculated for mol 335: N=4.2%; P=9.1%. Found: N=4.6%; P=8.9%.

We claim:
1. A phosphonic acid ester of the general formula

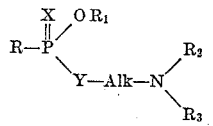

wherein R stands for a member selected from the group consisting of lower alkyl, cyclohexyl, lower alkyl-substituted vinyl, phenyl-substituted vinyl, and phenyl radicals, $R_1$ stands for a lower alkyl radical, $R_2$ stands for a member selected from the group consisting of lower alkyl and phenyl radicals, $R_3$ stands for lower alkyl radicals, and when

are taken together, it stands for a member selected from the group consisting of piperidyl and morpholyl radicals; Alk stands for a lower alkylene radical; and X and Y are each a chalcogen having an atomic weight between 16 and 33.

2. A phosphonic acid ester of claim 1 wherein X and Y are each sulfur.

3. A phosphonic acid ester of claim 1 wherein X is sulfur and Y is oxygen.

4. A phosphonic acid ester of claim 1 wherein X is oxygen and Y is sulfur.

5. A sulfonic acid ester of claim 1 wherein X and Y are oxygen.

References Cited in the file of this patent

FOREIGN PATENTS 738,839    Great Britain  ---------- Oct. 19, 1955

OTHER REFERENCES

Ghosh et al.: "Chemistry and Industry," 1955, page 118.

Tammelin: "Acta Chem. Scand.," 11, No. 8, pp. 1340–1349 (1957).